(12) United States Patent
Takao (10) Patent No.: US 7,360,288 B2
(45) Date of Patent: Apr. 22, 2008

(54) BUCKLE SWITCH, BUCKLE INCLUDING BUCKLE SWITCH, AND SEAT BELT DEVICE INCLUDING BUCKLE

(75) Inventor: Tomohiro Takao, Minato-ku (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 11/373,750

(22) Filed: Mar. 10, 2006

(65) Prior Publication Data
US 2006/0207074 A1 Sep. 21, 2006

(30) Foreign Application Priority Data
Mar. 17, 2005 (JP) ............................. 2005-076733

(51) Int. Cl.
*A44B 11/25* (2006.01)
*B60R 21/01* (2006.01)
*B60R 22/00* (2006.01)
*B60R 22/48* (2006.01)

(52) U.S. Cl. ................... 24/633; 200/61.58 B
(58) Field of Classification Search .......... 200/61.58 B
See application file for complete search history.

(56) References Cited

U.S. PATENT DOCUMENTS

| 3,781,497 A | * | 12/1973 | Stephenson et al. .. 200/61.58 B |
| 4,785,906 A | * | 11/1988 | Kang .......................... 180/270 |
| 5,109,199 A | | 4/1992 | Berger |
| 5,590,904 A | * | 1/1997 | Ellis et al. ................... 280/735 |
| 5,941,337 A | * | 8/1999 | Castellanos et al. ........ 180/287 |
| 6,729,427 B1 | * | 5/2004 | Do .............................. 180/268 |
| 7,084,362 B2 | * | 8/2006 | Ebert ................... 200/61.58 B |
| 2001/0033492 A1 | | 10/2001 | Rogers et al. |

FOREIGN PATENT DOCUMENTS

| DE | 19608223 A1 | 9/1997 |
| GB | 2310958 A | 9/1997 |
| JP | 2004-4311091 | 11/2004 |

OTHER PUBLICATIONS

A search report dated May 11, 2006, from the European Patent Office in corresponding European Application No. 06003584.7-2421.

* cited by examiner

Primary Examiner—Robert J. Sandy
(74) Attorney, Agent, or Firm—Fitch, Even, Tabin & Flannery (57) ABSTRACT

A buckle switch is provided which, in one form, can sufficiently ensure electrical conduction between movable contacts and fixed contacts. Fixed contacts and are provided in a switch main body. In a movable piece, movable contacts electrically connected to one another are positioned in a straight line perpendicular to the movement direction of the movable piece. The movable contacts are separated from or slidably contact the fixed contacts, respectively. The movable contact always slidably contacts the fixed contact. An lower edge of the fixed contact and an upper edge of the fixed contact are positioned in another straight line perpendicular to the movement direction of the movable piece. Thus, it is possible to ensure electrical conduction between the fixed contacts and the movable contacts for a long time and the switching time of the switch can be shortened.

19 Claims, 6 Drawing Sheets

NC TERMINAL   NO TERMINAL   COM TERMINAL

BUCKLE SWITCH, BUCKLE INCLUDING BUCKLE SWITCH, AND SEAT BELT DEVICE INCLUDING BUCKLE

FIELD OF THE INVENTION

The present invention relates to a buckle which is equipped in a vehicle such as an automobile and into which a tongue slidably supported by a seat belt for protecting a vehicle occupant is inserted and engaged, and a seat belt device including the same, and more particularly, it relates to a buckle switch for detecting engagement between a tongue and a buckle, a buckle including the buckle switch, and a seat belt device including the buckle.

BACKGROUND OF THE INVENTION

Conventionally, a seat belt device equipped in a vehicle such as an automobile prevents a vehicle occupant from being thrown out of a seat by securing the vehicle occupant using a seat belt to protect the vehicle occupant at the time of an emergency such as a case where rapid deceleration of a vehicle due to a collision occurs. Such a seat belt device includes a tongue slidably supported by the seat belt and a buckle fixed to a vehicle body or a vehicle seat. By inserting and engaging the tongue into the buckle, the seat belt is fastened across the vehicle occupant and the vehicle occupant sitting in the vehicle seat is secured and protected by the seat belt.

In order to detect whether the seat belt is fastened across the vehicle occupant, a buckle switch for detecting engagement between the tongue and the buckle is provided in the buckle. As a conventional buckle switch, there is provided a buckle switch in which an actuator for operating a press button of a switch is provided in a switch main body and which detects the engagement between the tongue and the buckle by moving a switch operator such as an ejector using a tongue inserted into the buckle, operating the actuator with the movement of the switch operator, and pressing the press button to switch on the switch with the operation of the actuator (for example, see Japanese Unexamined Patent Application Publication No. 2004-311091).

Figure 6A:
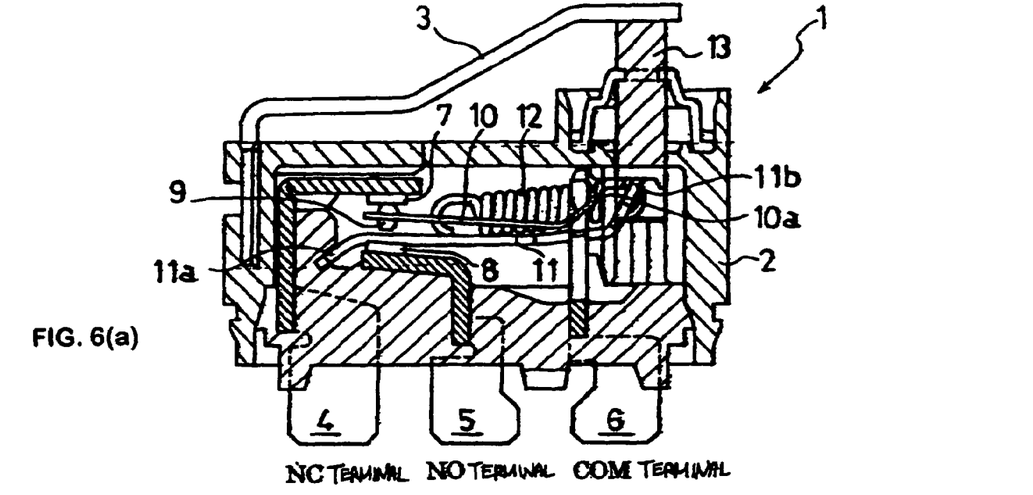
FIG. 6(a) is a cross-sectional view illustrating an OFF state of the buckle switch.
Figure 6B:
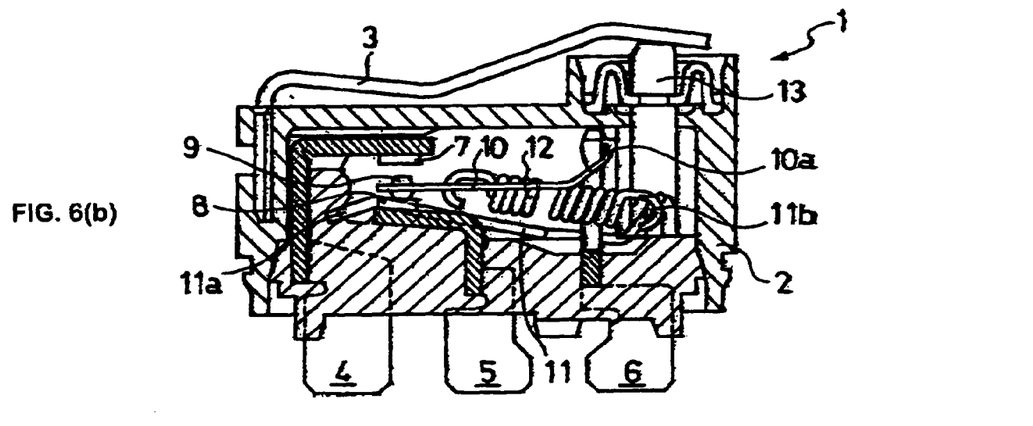
FIG. 6(b) is a cross-sectional view illustrating an ON state of the buckle switch.
Figure 6C:
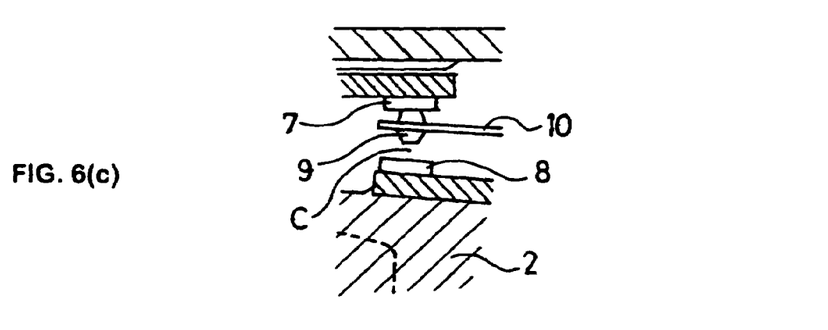
FIG. 6(c) is a partial enlarged cross-sectional view of a contact portion of the buckle switch.

FIGS. 6(a)-6(c) illustrate a buckle switch disclosed in Japanese Unexamined Patent Application Publication No. 2004-311091, where FIG. 6(a) is a cross-sectional view illustrating an OFF state of the buckle switch, FIG. 6(b) is a cross-sectional view illustrating an ON state of the buckle switch, and FIG. 6(c) is a partial enlarged cross-sectional view of a contact portion of the buckle switch. In FIG. 6(a), 1 denotes the buckle switch, 2 denotes a switch main body, 3 denotes an actuator which is provided in the switch main body 2 such that it can be flexibly bent, 4 denotes a normally-closed fixed terminal fixed to the switch main body 2 (hereinafter, referred to as NC terminal), 5 denotes a normally-opened fixed terminal fixed to the switch main body 2 (hereinafter, referred to as NO terminal), 6 denotes a common terminal fixed to the switch main body 2 (hereinafter, referred to as COM terminal), 7 denotes a fixed contact electrically connected and attached to the NC terminal 4 at the upper side of the NC terminal 4, 8 denotes a fixed contact which is electrically connected and attached to the NO terminal 5 at the upper side of the NO terminal 5 and faces the fixed contact 7, 9 denotes a movable contact which can selectively contact two fixed contacts 7 and 8, 10 denotes a movable piece which is provided in the switch main body 2 such that it rotates about a point 10a and, electrically connects the movable contact 9 with the COM terminal 6, 11 denotes a second actuator which is provided in the switch main body 2 such that it rotates about a point 11a of one end thereof and has an operation point 1b at the other end thereof, 12 denotes a spring mounted between the movable piece 10 and the operation point 11b of the second actuator 11 in a pressed state, and 13 denotes a press button which contacts the operation point 11b of the second actuator 11 such that it can press the operation point 11b of the second actuator 11.

Furthermore, at the time of non-operation of the buckle switch 1, as shown in FIG. 6(a), the movable piece 10 is biased at the center of the point 10a in a clockwise direction by a biasing force of the spring 12, and the movable contact 9 of the COM terminal 6 contacts the fixed contact 7 of the NC terminal 4 and is separated from the fixed contact 8. Accordingly, the COM terminal 6 is electrically connected with the NC terminal 4 and disconnected from the NO terminal 5, and the buckle switch 1 is in the OFF state. At this time, since the movable piece 10 is biased by the biasing force of the spring 12 in a direction that the movable contact 9 contacts the fixed contact 7, the contact between the movable contact 9 and the fixed contact 7 is held without sudden separation.

In the non-operation state of the buckle switch 1, when a tongue (not shown) is inserted into a buckle (not shown), a switch operator (not shown) such as an ejector of the buckle is moved by this tongue. The actuator 3 is flexibly bent downward with the movement of the switch operator and presses the press button 13 downward. Then, the press button 13 is moved downward to contact the operation point 11b of the second actuator 11 and press the operation point 11b downward. Thus, the second actuator 11 rotates about the point 11a in the clockwise direction and the operation point 11b is moved downward. To this end, since the end of the spring 12 located at the side of the operation point 11b is moved downward, the biasing force of the spring 12 for biasing the movable piece 10 in the clockwise direction gradually decreases.

Furthermore, when the operation point 11b is moved downward and the tongue is inserted into a position where it can be engaged with the buckle, the direction of the biasing force of the spring 12 for biasing the movable piece 10 is changed from the clockwise direction to a counterclockwise direction and the movable piece 10 rotates about the point 10a in the counterclockwise direction. Thus, as shown in FIG. 6(b), the movable contact 9 is separated from the fixed contact 7 and contacts the fixed contact 8. Accordingly, the COM terminal 6 is disconnected from the NC terminal 4 and electrically connected to the NO terminal 5. As the result, the buckle switch 1 is switched on and is in an operation state. At this time, since the movable piece 10 is biased by the biasing force of the spring 12 in a direction that the movable contact 9 contacts the fixed contact 8, the contact between the movable contact 9 and the fixed contact 8 is held without sudden separation. In addition, since the contact is changed by the biasing force of the spring 12, the buckle switch 1 is switched from OFF to ON at a relatively high speed.

When the tongue is pulled out of the buckle, the force of the actuator 3 for pressing the press button 13 gradually decreases and finally disappears. Then, the second actuator 11 rotates about the point 11a in the counterclockwise direction by the biasing force of a return spring (not shown), and an operation portion C and the press button 13 are moved upward toward a non-operation position. The direction of the biasing force of the spring 12 against the movable piece 10 is changed from the counterclockwise direction to the clockwise direction and the movable piece 10 rotates about the point 10a in the clockwise direction. Then, as shown in FIG. 6(a), the movable contact 9 is separated from the fixed contact 8 and contacts the fixed contact 7. Thus, the COM terminal 6 is disconnected from the NO terminal 5 and electrically connected to the NC terminal 4. As the result, the buckle switch 1 is switched off and is in an initial operation state.

However, since the contact structure of the buckle switch 1 disclosed in Japanese Unexamined Patent Application Publication No. 2004-311091 is a butt contact structure in which the movable contact 9 vertically contacts each of the fixed contacts 7 and 8 the following problems are caused. That is, for example, as shown in FIG. 6(c), in a case where a gap C is generated between the movable contact 9 and the fixed contact 8, if a foreign material exists in the gap C, the foreign material is inserted between the movable contact 9 and the fixed contact 8 when the movable contact 9 contacts the fixed contact 8. Although not shown, similarly, even in a case where a gap C is generated between the movable contact 9 and the fixed contact 7, the foreign material is inserted between the movable contact 9 and the fixed contact 7. If the foreign material is inserted between the movable contact 9 and each of the fixed contacts 7 and 8, it may be difficult to sufficiently ensure electrical conduction. Furthermore, if a non-conductive product is generated at the respective surfaces of the fixed contacts 7 and 8 and the movable contact 9 due to a long-term use of the buckle switch 1, it may be difficult to sufficiently ensure electrical conduction.

Accordingly, it is difficult to surely operate the buckle including the buckle switch 1 and the seat belt device including the buckle for a long time, and it is difficult to stably perform various control operations related to a seat belt when driving a vehicle based on installation of the seat belt, such as an operation of controlling components of the vehicle and an operation of controlling tension of the seat belt.

In addition, since the buckle switch 1 has the butt contact structure, it is difficult to automatically remove a foreign material inserted between the movable contact 9 and each of the fixed contacts 7 and 8 and a non-conductive product generated at the respective surfaces of the fixed contacts 7 and 8 and the movable contact 9. Thus, a cleaning operation for removing the foreign material or the non-conductive product should be periodically performed.

SUMMARY OF THE INVENTION

Accordingly, it is an object of the present invention to provide a buckle switch which can sufficiently ensure electrical conduction between a movable contact and a fixed contact for a long time.

It is another object of the present invention to provide a buckle and a seat belt device, which can surely operate for a long time and stably perform various control operations related to a seat belt.

In order to solve the aforementioned problems, according to one aspect, there is provided a buckle switch which comprises a movable contact which is moved by an actuator which operates by position change of an element of which the position is changed at the time of engagement and non-engagement between a tongue and a buckle; and a fixed contact to which the movable contact can be attached or detached, and detects the engagement between the tongue and the buckle in the state that the movable contact and the fixed contact are attached to and detached from each other, wherein the movable contact and the fixed contact slidably contact each other so that there is a slide interface therebetween.

The buckle switch according to one form is characterized in that a movable piece which is moved by the actuator is included, the movable contact comprises first and second movable contacts fixed to the movable piece, the fixed contact comprises first and second fixed contacts to which the fist and second movable contacts can be attached or detached, respectively, a third movable contact fixed to the movable piece and a third fixed contact which always contacts the third movable contact are further included, the first to third movable contacts are electrically connected to one another, the first and second fixed contacts are electrically connected to a normally-closed fixed terminal and a normally-opened fixed terminal, respectively, and the third fixed contact is electrically connected to a common terminal, and the first to third movable contacts slidably contact the first to third fixed contacts, respectively.

The buckle switch according to another form is characterized in that the first to third movable contacts are provided in a straight line perpendicular to the movement direction of the movable piece, and an end edge of the first fixed contact connected to the normally-closed fixed terminal and a start edge of the second fixed contact connected to the normally-opened fixed terminal are set on another straight line perpendicular to the movement direction of the movable piece.

The buckle switch according to another form includes an operator which operates by the actuator moving and contacting the operator and connects the movable contact to the fixed contact. The position of the element is changed with the straight line movement, the actuator has a pressed portion which is pressed by the element and the pressed portion has a contact surface which contacts the element, and the contact surface is formed of a sloped surface which slopes by 45 degrees or more with respect to the movement direction of the element at the time of switching OFF to ON.

The buckle switch according to another form further includes an actuator biasing means which biases the actuator in a direction that the movable contact is not moved when the operation amount of the actuator is not greater than a predetermined amount, and biases the actuator in a direction that the movable contact is moved when the operation amount of the actuator is greater than the predetermined amount.

According to another form, there is provided a buckle comprising a buckle switch which operates when a tongue is inserted into and engaged with the buckle, wherein the buckle switch is the buckle switch according to any one of the above-described forms.

According to another form, there is provided a seat belt device comprising at least a seat belt for securing a vehicle occupant, a seat belt retractor which retracts the seat belt such that the seat belt can be pulled out, a tongue slidably supported by the seat belt, and a buckle to which the tongue is detachably engaged, wherein the buckle is the buckle according to the above-described form.

According to the buckle switch according to some of the above-described forms, since the movable contact slidably contacts the fixed contact, it is difficult to insert a foreign material between the movable contact and the fixed contact. Although the foreign material is inserted between the contacts, it is possible to easily remove the foreign material by the sliding between the movable contact and the fixed contact. In addition, it is difficult to generate a non-conductive product at the contact surface between the movable contact and the fixed contact by the slidably contact between the movable contact and the fixed contact. Furthermore, although the non-conductive product is generated at the contact surface, it is possible to easily remove the non-conductive product by the sliding between the movable contact and the fixed contact. Accordingly, the buckle switch is switched on or off while removing the foreign material or the non-conductive product or can automatically remove the foreign material or the non-conductive product by switching on/off the buckle switch. Thus, the electrical conduction between the movable contact and the fixed contact can be sufficiently ensured for a long time.

Particularly, according to one of the above forms, since the first to third movable contacts are provided in a straight line perpendicular to the movement direction of the movable piece and the end edge of the first fixed contact and the start end of the second fixed contact are provided in another straight line perpendicular to the movement direction of the movable piece, the stroke loss of the movable contacts can be substantially removed. Accordingly, the buckle switch can be switched on/off at a high speed or in a short time, without substantially the time lag. Thus, the switching time of the switch can be shortened.

Moreover, according to another one of the above forms, since the pressed portion of the actuator has the contact surface which contacts the element and the contact surface is formed of the sloped surface which slopes by 45 degrees or more with respect to the movement direction of the element when the buckle switch is switched from OFF to ON, the speed of switching the buckle switch 1 from OFF to ON can increase.

In addition, according to yet another one of the above forms, since the actuator is biased by the actuator biasing means in a direction that the movable contact is not moved when the operation amount of the actuator is not greater than a predetermined amount, and the actuator is biased by the actuator biasing means in a direction that the movable contact is moved when the operation amount of the actuator is greater than the predetermined amount, the operation of switching the buckle switch from ON and OFF can be rapidly performed and the buckle switch is surely and stably held in both the non-operation state and the operation state.

Moreover, according to the buckle and the seat belt device of the present invention, it is possible to surely perform the operation for a long time and stably perform various control operations related to the seat belt when driving the vehicle, such as the operation of controlling the other components of the vehicle or the operation of controlling the tension of the seat belt, based on the installation of the seat belt.

BRIEF DESCRIPTION OF THE DRAWINGS

FIGS. 2(a)-2(c) schematically illustrate a buckle switch according to an embodiment of the present invention, where

FIGS. 3(a)-3(c) schematically illustrate the buckle switch shown in FIGS. 2(a)-2(c), where

FIGS. 5(a)-5(c) schematically illustrate a buckle switch according to another embodiment of the present invention, where

FIGS. 6(a)-6(c) illustrate a buckle switch disclosed in Japanese Unexamined Patent Application Publication No. 2004-311091, where

DETAILED DESCRIPTION OF THE PREFERRED EMBODIMENTS

Figure 1:
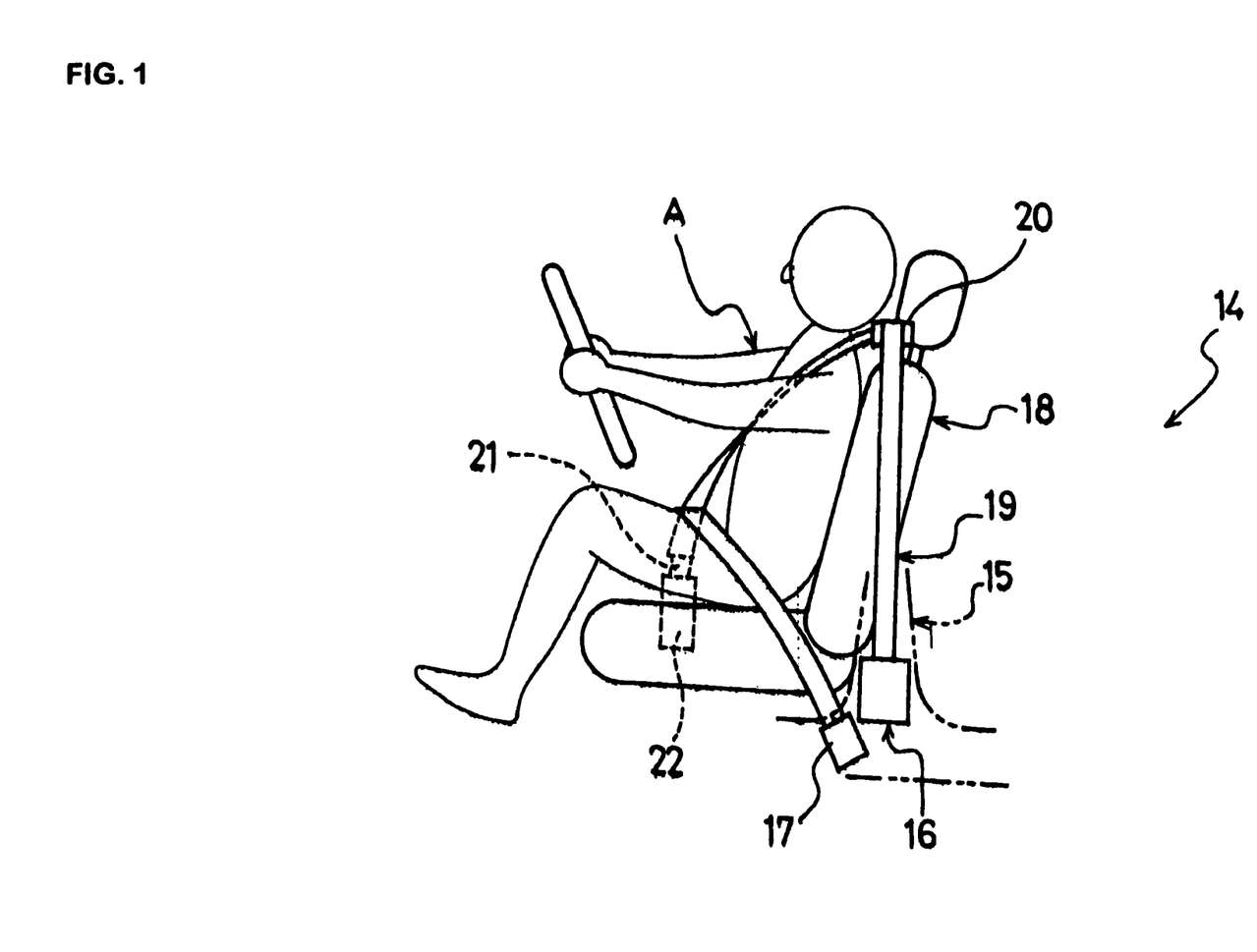
FIG. 1 schematically illustrates a seat belt device including a buckle according to an embodiment of the present invention.

As shown in FIG. 1, the seat belt device 14 according to the present embodiment includes a seat belt retractor 16 which is fixed to a B pillar 15 of a vehicle body and driven by a motor, a seat belt 19 which is pulled out of the seat belt retractor 16 and of which a belt anchor 17 of the front end is fixed to the bottom of the vehicle body or a vehicle seat 18, a guide anchor 20 which is provided in the vehicle body such as a center pillar and guides the seat belt 19 pulled out of the seat belt retractor 16 toward the shoulder of a vehicle occupant A, a tongue 21 which is slidably supported by the seat belt 19 guided by the guide anchor 20, and a buckle 22 which is fixed to the bottom of the vehicle body or the vehicle seat and into which the tongue 21 is detachably inserted and engaged. The seat belt retractor 16, the belt anchor 17, the seat belt 19, the guide anchor 20, the tongue 21, and the buckle 22 are conventionally well known.

Figures 2A, 2B, 2C:
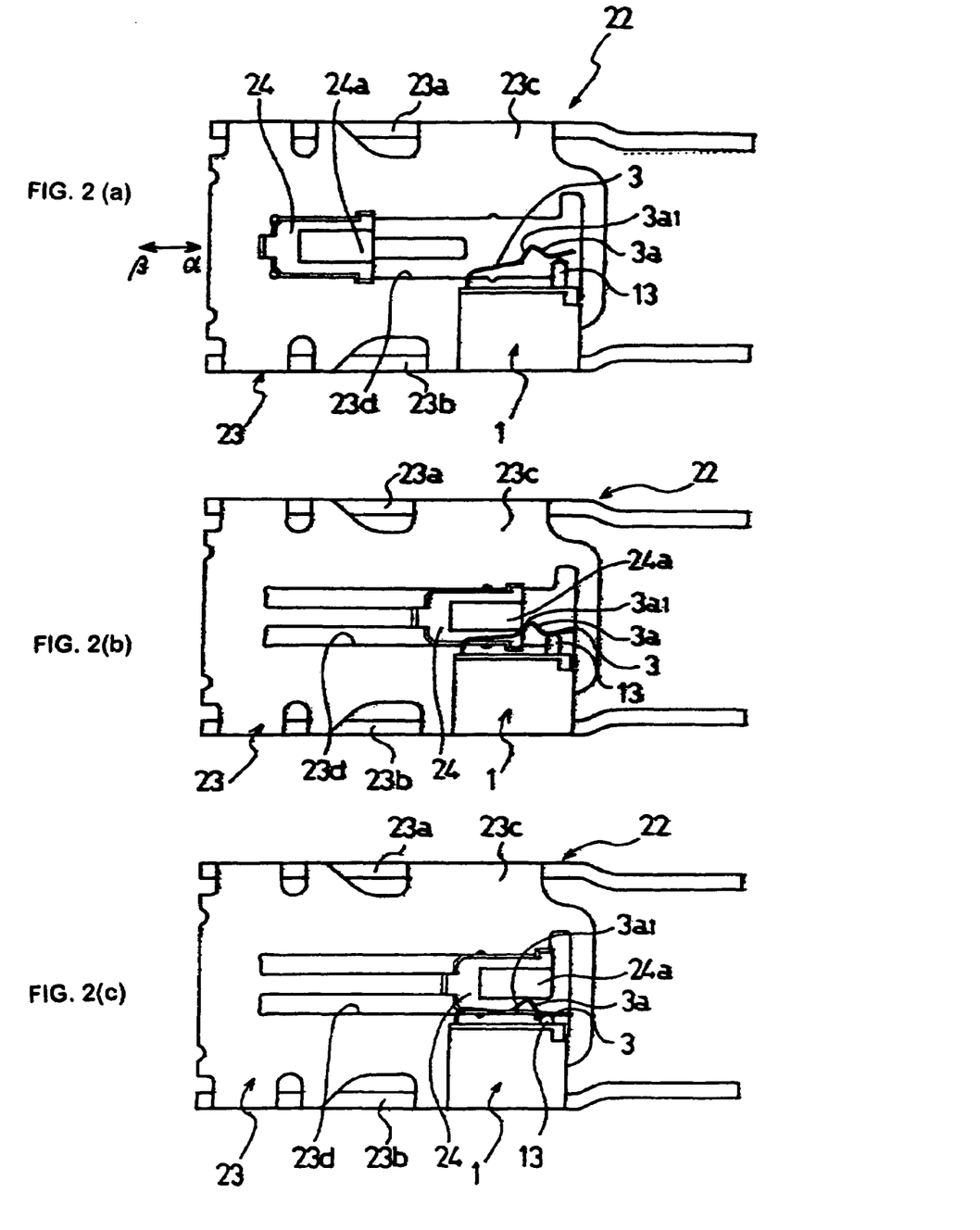
FIG. 2(a) illustrates a non-operation state of the buckle switch.
FIG. 2(b) illustrates an operation start state of the buckle switch.
FIG. 2(c) illustrates an operation state of the buckle switch.

FIGS. 2(a)-2(c) schematically illustrate a buckle switch according to an embodiment of the present invention, where FIG. 2(a) illustrates a non-operation state of the buckle switch, FIG. 2(b) illustrates an operation start state of the buckle switch, and FIG. 2(c) illustrates an operation state of the buckle switch. Hereinafter, the same components as those of the conventional example shown in FIGS. 6(a)-6(c) are denoted with the same reference numerals and thus their detailed description will be omitted.

As shown in FIG. 2(a), a buckle 22 has a base frame 23 having a U-shaped cross section and having both sidewalls 23a and 23b and a bottom wall 23c. A guide hole 23d which extends in a longitudinal direction (horizontal direction in FIG. 2(a)), that is, directions α and β of inserting and ejecting a tongue 21, is perforated in the center of the bottom wall 23c of the base frame 23. An ejector 24 (corresponding to an element of which the position is changed at the time of engagement and non-engagement between the tongue and the buckle) for ejecting and releasing the tongue 21 inserted into the buckle 22 from the buckle 22 is slidably provided in the guide hole 23d and is guided by the guide hole 23d. An actuator pressing portion 24a which contacts and presses an actuator 3 of a buckle switch 1 is provided in the ejector 24. This ejector 24 is always biased in the direction β of ejecting the tongue 21 by an ejector spring (not shown). The basic structures of the base frame 23, the ejector 24, and the ejector spring are conventionally well known and thus their detailed description will be omitted.

The buckle switch 1 is provided on the bottom wall 23*c* of the base frame 23.

Figures 3A, 3B:
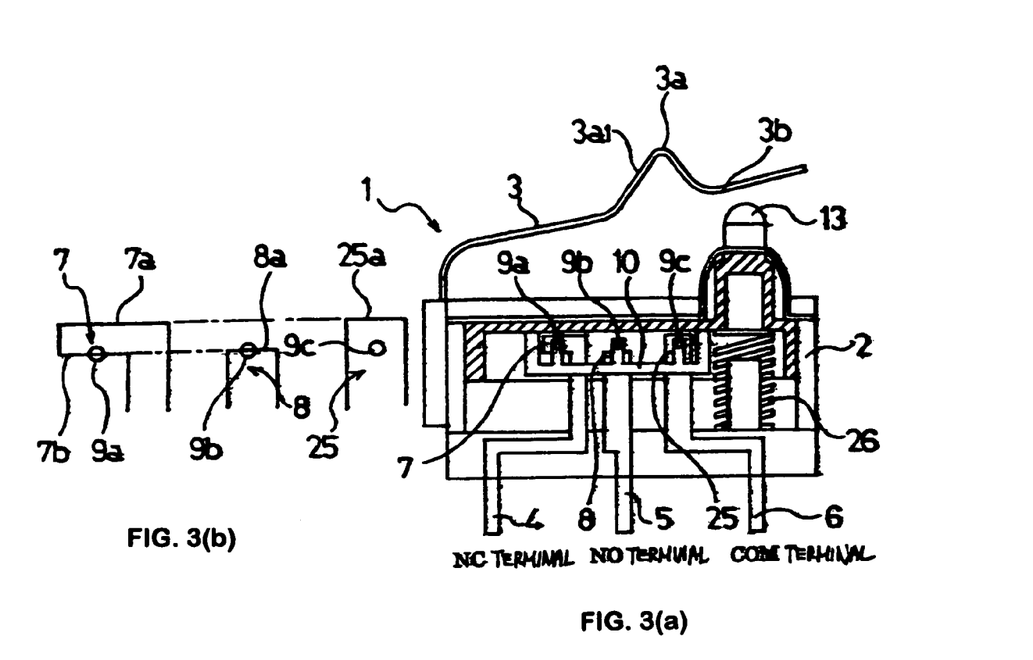
FIG. 3(a) is a cross-sectional view illustrating the non-operation state of the buckle switch.
FIG. 3(b) illustrates the position relationship among fixed contacts.
Figure 3C:
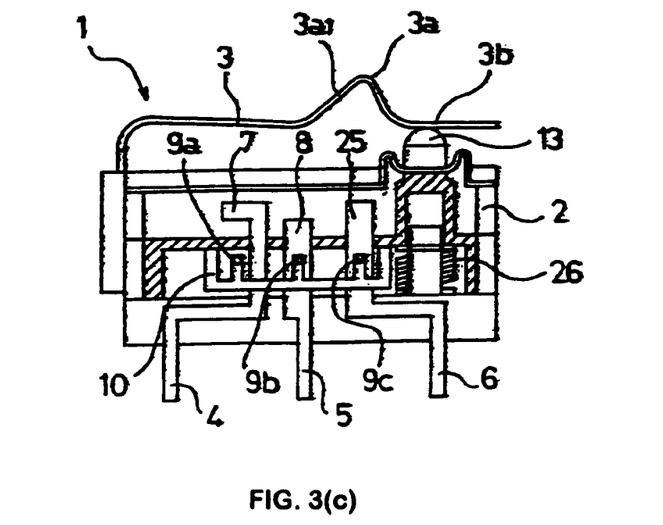
FIG. 3(c) is a cross-sectional view illustrating the operation state of the buckle switch.

FIGS. 3(*a*)-3(*c*) schematically illustrate the buckle switch, where FIG. 3(*a*) is a cross-sectional view illustrating a non-operation state of the buckle switch, similar to FIG. 6(*a*), FIG. 3(*b*) illustrates the position relationship among fixed contacts, FIG. 3(*c*) illustrates an operation state of the buckle switch, similar to FIG. 6(*b*).

As shown in FIG. 3(*a*), the buckle switch 1 according to the present embodiment includes a NC terminal 4, a NO terminal 5, and a COM terminal 6 provided in a switch main body 2, respectively. A fixed contact 7 electrically connected and attached to the NC terminal 4 is provided above the NC terminal 4, a fixed contact 8 electrically connected and attached to the NO terminal 5 is provided above the NO terminal 5, and a fixed contact 25 electrically connected and attached to the COM terminal 6 is provided above the COM terminal 6.

Furthermore, a movable piece 10 is attached to a press button 13 and straightly moved downward in the switch main body 2 by pressing the press button 13 downward in FIG. 3(*a*). In addition, three movable contacts 9*a*, 9*b*, and 9*c* are arranged at the movable piece 10 in a straight line perpendicular to the movement direction of the movable piece 10. In this case, the three movable contacts 9*a*, 9*b*, and 9*c* are electrically connected with one another.

The movable contact 9*a* is separated from and slidably contacts the fixed contact 7, and the movable contact 9*b* is separated from and slidably contacts the fixed contact 8, and the movable contact 9*c* always slidably contacts the fixed contact 25. The buckle switch 1 according to the present embodiment is constructed as a slide switch. Moreover, it goes without saying that the movable piece 10 does not contact a conducting wire (or a conductor) for electrically connecting the fixed contacts 7, 8, and 25 with the NC terminal 4, the NO terminal 5, and the COM terminal 6 corresponding to the fixed contacts 7, 8, and 25, respectively.

Furthermore, as shown in FIG. 3(*b*), an upper edge 7*a* of the fixed contact 7 of the NC terminal 4 and an upper edge 25*a* of the fixed contact 25 of the COM terminal 6 are positioned in another straight line perpendicular to the movement direction of the movable piece 10, and a lower edge 7*b* (an end edge in the present invention) of the fixed contact 7 of the NC terminal 4 and an upper edge 8*a* (a start edge in the present invention) of the fixed contact 8 of the NO terminal 5 are positioned in another straight line perpendicular to the movement direction of the movable piece 10. Accordingly, as shown in FIG. 3(*b*), when two movable contacts 9*a* and 9*b* are positioned at the lower edge 7*b* of the fixed contact 7 and the upper edge 8*a* of the fixed contact 8, respectively, the movable contact 9*c* contacts the corresponding fixed contact 25, both the fixed contact 7 and the fixed contact 8 are electrically connected to the movable piece 10 and the fixed contact 25, and the buckle switch 1 is in a neutral state.

As shown in FIG. 3(*a*), the press button 13 is always biased by a return spring 26 upward, that is, in a non-operation position. In addition, the actuator 3 for pressing the press button 13 is formed in a lever shape and can be flexibly bent. An inverted V-shaped pressed portion 3*a* is provided at the middle portion of the actuator 3 and a pressing portion 3*b* for pressing the press button 13 is provided at the front end of the pressed portion 3*a*. The pressed portion 3*a* has a contact surface 3*a*$_1$, formed of a sloped surface which can contact the ejector 24. The contact surface 3*a*$_1$, detects the movement of the ejector 24.

Moreover, a contact angle θ (slope angle with respect to the movement direction of the ejector 24) that the ejector 24 contacts the contact surface 3*a*$_1$, is preferably set to 45 degrees or more in a timing that the contact of the COM terminal 6 is changed from the NC terminal 4 to the NO terminal 5 and the buckle switch 1 is switched from OFF to ON, that is, in the neutral state of the buckle switch 1. Accordingly, the switch speed of the buckle switch 1 from the NC terminal 4 to the NO terminal 5 can more increase.

The other constructions of the buckle switch 1 according to the present embodiment are the same as those of the buckle switch 1 disclosed in Japanese Unexamined Patent Application Publication No. 2004-311091 shown in FIGS. 6(*a*)-6(*c*).

As shown in FIG. 2(*a*), the buckle switch 1 according to the present embodiment is provided in the bottom wall 23*c* of the base frame 23 of the buckle 22 such that the contact surface 3*a*$_1$, of the pressed portion 3*a* of the actuator 3 can contact the actuator pressing portion 24*a* of the ejector 24 which is moved together with insertion of the buckle 22 of the tongue 21.

The other constructions of the buckle 22 having the buckle switch 1 according to the present embodiment are the same as those of the conventional buckle.

In the buckle 22 having the buckle switch 1, as shown in FIG. 2(*a*), in the non-operation state of the buckle 22 into which the tongue 21 is not inserted, the ejector 24 is biased to the non-operation position of a leftmost position by the ejector spring. Accordingly, the actuator 3 of the buckle switch 1 is also freely in the non-operation position, the press button 13 is also in the non-operation position released from the actuator 3, and the buckle switch 1 is in the non-operation state.

In the non-operation state of the buckle switch 1, as shown in FIG. 3(*a*), the movable contact 9*a* contacts the substantially middle portion between the upper and lower edges 7*a* and 7*b* of the fixed contact 7, and the movable contact 9*b* is separated from the fixed contact 8 in a position slightly higher than the upper edge 8*a* of the fixed contact 8, and the movable contact 9*c* contacts a position lower than the upper edge 25*a* of the fixed contact 25. Accordingly, the COM terminal 6 is electrically connected to the NC terminal 4 and electrically disconnected from the NO terminal 5. Thus, the buckle switch 1 is in the OFF state.

When the tongue 21 is inserted into the buckle 22 along the insertion direction α in the non-operation state of the buckle 22, the front end of the tongue 21 contacts the ejector 24 and horizontally presses the ejector 24, similar to the conventional tongue and buckle. Then, the ejector 24 is guided by the guide hole 23*d* and moved straight to the right side against the biasing force of the ejector spring. Thus, the position of the ejector 24 is changed.

When the tongue 21 is inserted into the buckle 22 by a predetermined size, the actuator pressing portion 24*a* of the ejector 24 contacts the contact surface 3*a*$_1$ of the pressed portion 3*a* of the actuator 3 and presses the contact surface 3*a*$_1$ to the right side. Then, the actuator 3 rotates in the clockwise direction and is flexibly bent and, as shown in FIG. 2(*b*), the pressing portion 3*b* contacts the press button 13. When the tongue 21 is further inserted into the buckle 22 and the ejector 24 is further moved to the right side, the actuator 3 is more flexibly bent and the pressing portion 3*b* presses the press button 13 downward.

In FIG. 3(*a*), the press button 13 is moved downward against the biasing force of the return spring 26 and the movable piece 10 is straightly moved downward in accordance with the downward movement of the press button 13.

Accordingly, the movable contact 9a slides on the fixed contact 7 to be positioned at the lower edge 7b, and the movable contact 9b is positioned at the upper edge 8a of the fixed contact 8. Thus, the buckle switch 1 is in the neutral state. At this time, the movable contact 9c slides on the fixed contact 25. Furthermore, when the ejector 24 is further moved to the right side in accordance with the insertion of the tongue 21, the press button 13 and the movable piece 10 are further move downward, the movable contact 9a is separated from the fixed contact 7, the movable contact 9b fully contacts the fixed contact 8 and slides on the fixed contact 8, and the movable contact 9c slides on the fixed contact 25.

At this time, since the contact angle θ between the ejector 24 and the contact surface $3a_1$ is set to 45 degrees or more, the press button 13, that is, the movable contacts 9a, 9b, and 9c are moved at a relatively high speed. Thus, the COM terminal 6 is rapidly switched from the NC terminal 4 to the NO terminal 5, and the COM terminal 6 is electrically connected to the NO terminal 5 and electrically disconnected from the NC terminal 4. Thus, the buckle switch 1 is switched from OFF to ON. At the time of switching the buckle switch 1 from OFF to ON, since the lower edge 7b of the fixed contact 7 of the NC terminal 4 and the upper edge 8a of the fixed contact 8 of the NO terminal 5 are positioned in another straight line perpendicular to the movement direction of the movable piece 10, stroke loss of the movable contacts 9a and 9b is hardly generated. Thus, the buckle switch 1 is rapidly switched from OFF to ON through the instantaneous neutral state, without substantially a time lag.

When the tongue 21 is further slightly inserted and, as shown in FIG. 2(c), the side surface of the actuator pressing portion 24a of the ejector 24 parallel to the movement direction is positioned at the top of the inverted V-shaped pressed portion 3a of the actuator 3, the pressed portion 3a does not press the press button 13 anymore and this pressing state is held. Accordingly, the buckle switch 1 is held in the ON state shown in FIG. 3(c). In this state, the tongue 21 is engaged with the buckle 22.

When the engagement between the tongue 21 and the buckle 22 is released by operating a release button (not shown) of the buckle 22, the ejector 24 is moved to the left side, that is, in the ejection direction β by the biasing force of the ejector spring and thus the tongue 21 is pulled out of the buckle 22. In accordance with the movement of the ejector 24 in the ejection direction β, the side surface of the actuator pressing portion 24a is deviated from the top of the inverted V-shaped pressed portion 3a and thus the force of the ejector 24 for pressing the actuator 3 gradually decreases. Then, the press button 13 is moved upward by the biasing force of the return spring 26 and thus the movable piece 10 is also moved upward. Accordingly, the three movable contacts 9a, 9b, and 9c are also moved upward. The movable contact 9a contacts the fixed contact 7 and slides on the fixed contact 7 via the neutral state, the movable contact 9b is separated from the fixed contact 8, and the movable contact 9c slides on the fixed contact 25. Thus, the buckle switch 1 is switched from ON to OFF.

When the actuator pressing portion 24a of the ejector 24 is far apart from the contact surface $3a_1$ of the pressed portion 3a, as shown in FIG. 3(a), the actuator 3 and the press button 13 of the buckle switch 1 is freely positioned in the non-operation position. In addition, finally, as shown in FIG. 2(a), the ejector 24 is positioned in the leftmost non-operation position in the buckle 22.

According to the buckle switch 1 of the present embodiment, since the movable contacts 9a, 9b, and 9c slidably contact the corresponding fixed contacts 7, 8, and 25, respectively, it is difficult to insert a foreign material at the respective slide interfaces between the movable contacts 9a, 9b, and 9c and the fixed contacts 7, 8, and 25. Although the foreign material is inserted between the contacts, it is possible to easily remove the foreign material by the sliding between the movable contacts 9a, 9b, and 9c and the fixed contacts 7, 8, and 25. In addition, the slidably contact between the movable contacts 9a, 9b, and 9c and the fixed contacts 7, 8, and 25 makes it difficult to generate a non-conductive product at the contact surface between the movable contacts 9a, 9b, and 9c and the fixed contacts 7, 8, and 25. Furthermore, although the non-conductive product is generated at the contact surface, it is possible to easily remove the non-conductive product by the sliding between the movable contacts 9a, 9b, and 9c and the fixed contacts 7, 8, and 25. Accordingly, the buckle switch 1 is switched on or off while removing the foreign material or the non-conductive product or can automatically remove the foreign material or the non-conductive product by switching on/off the buckle switch 1. Thus, the electrical conduction between the movable contacts 9a, 9b, and 9c and the fixed contacts 7, 8, and 25 can be sufficiently ensured for a long time.

Moreover, since the lower edge 7b of the fixed contact 7 of the NC terminal 4 and the upper edge 8a of the fixed contact 8 of the NO terminal 5 are positioned in the straight line perpendicular to the movement direction of the movable piece 10 and the three movable contacts 9a, 9b, and 9c are positioned in the straight line perpendicular to the movement direction of the movable piece 10, the stroke loss of the movable contacts 9a and 9b can be substantially removed. Accordingly, the buckle switch 1 can be switched on/off at a high speed or in a short time, substantially without the time lag. Thus, the switching time of the switch can be shortened.

In addition, since the contact angle θ between the ejector 24 and the contact surface $3a_1$ is set to 45 degrees or more in the neutral state of the buckle switch 1, the speed of switching the buckle switch 1 from the NC terminal 4 to the NO terminal 5, that is, the speed of switching from OFF to ON can increase.

Furthermore, according to the buckle 22 and the seat belt device 14 of the present embodiment, it is possible to surely perform the operation for a long time and stably perform various control operations related to the seat belt 19 when driving the vehicle, such as the operation of controlling the other components (engine, steering, etc.) of the vehicle or the operation of controlling the tension of the seat belt 19, based on the installation of the seat belt 19.

Figure 4:
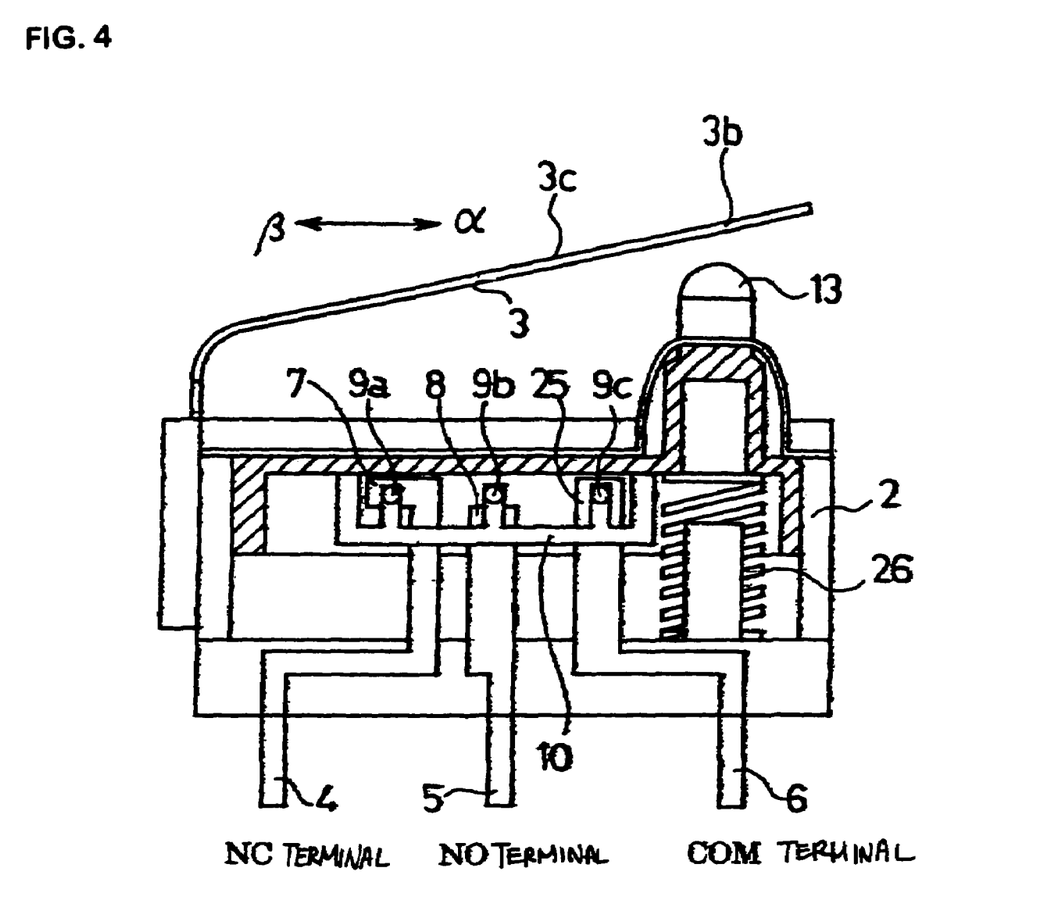
FIG. 4 is a schematic cross-sectional view of a buckle switch according to another embodiment of the present invention, similar to FIG. 3(a).

FIG. 4 is a schematic cross-sectional view of a buckle switch according to another embodiment of the present invention, similar to FIG. 3(a).

Whereas, in the embodiment shown in FIGS. 3(a) through 3(c), the inverted V-shaped pressed portion 3a which contacts the actuator pressing portion 24a of the ejector 24 is provided in the actuator 3 of the buckle switch 1, in the buckle switch 1 shown in FIG. 4, the inverted V-shaped pressed portion 3a is not provided in the actuator 3 and a contact portion 3c of the actuator 3 which contacts the actuator pressing portion 24a of the ejector 24 is provided in the same plane as that of the pressing portion 3b. Further, the plane having the contact portion 3c and the pressing portion 3b is a surface which slopes with respect to the movement direction of the ejector 24, that is, directions α and β of inserting and ejecting a tongue.

In the buckle switch 1 of the present embodiment, with respect to the movement size of the ejector 24, the movement size of the press button 13 cannot be larger than that of the embodiment shown in FIGS. 3(*a*) through 3(*c*). Accordingly, it is preferable that the position of the actuator pressing portion 24*a* of the ejector 24 which starts to contact the actuator 3 is located at a point that the actuator 3 is flexibly bent (that is, at the left end of the actuator 3 in FIG. 4). The slope angle of the plane having the contact portion 3*c* and the pressing portion 3*b* may be set to be large, similar to the slope angle of the contact surface 3*a*₁ of the inverted V-shaped pressed portion 3*a* of the embodiment shown in FIGS. 3(*a*) through 3(*c*). However, in this case, an exclusive space of the buckle switch 1 becomes larger. Accordingly, as in the embodiment shown in FIGS. 3(*a*) through 3(*c*), it is preferable that only the slope angle of the contact surface 3*a*₁ which contacts the actuator pressing portion 24*a* is set to be large regardless of whether or not the pressed portion 3*a* has an inverted V shape.

The other constructions and operations of the buckle switch 1 and the buckle 22 of the present embodiment are the same as those of the embodiment shown in FIGS. 3(*a*) through 3(*c*).

Figure 5A:
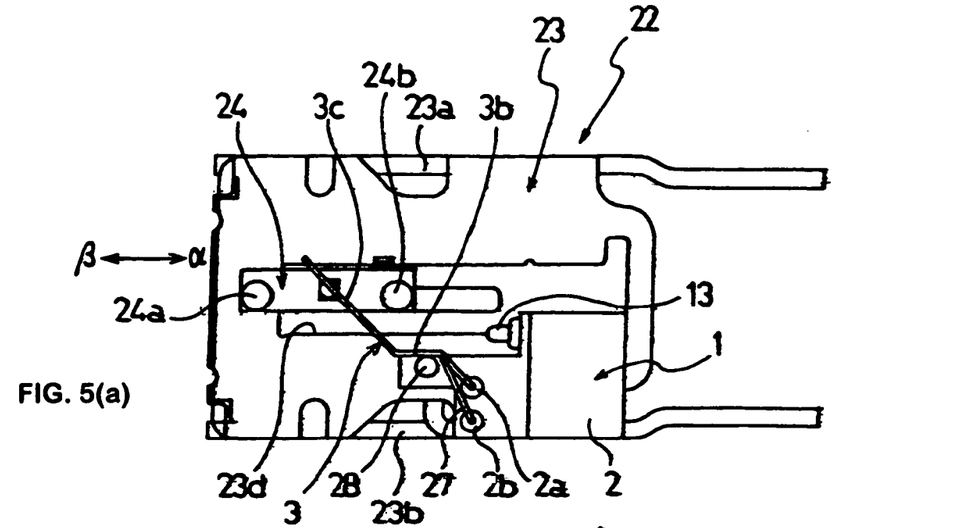
FIG. 5(a) illustrates a non-operation state of the buckle switch, similar to FIG. 2(a)
Figure 5B:
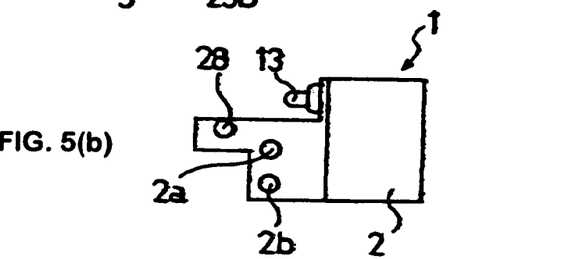
FIG. 5(b) illustrates the buckle switch including an actuator support portion, a spring support portion, and a actuator stopper.
Figure 5C:
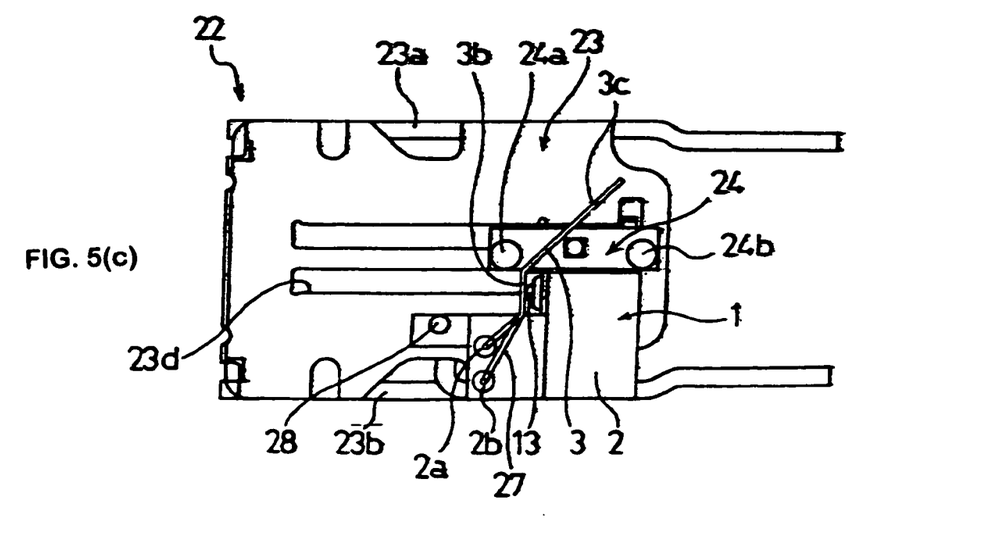
FIG. 5(c) illustrates an operation state of the buckle switch, similar to FIG. 2(c).

FIG. 5 schematically illustrates a buckle switch according to another embodiment of the present invention, where FIG. 5(*a*) illustrates a non-operation state of the buckle switch, similar to FIG. 2(*a*), and FIG. 5(*c*) illustrates an operation state of the buckle switch, similar to FIG. 2(*c*).

Whereas the actuator 3 of the buckle switch 1 is flexibly bent in the embodiment shown in FIGS. 3(*a*) through 3(*c*), the actuator 3 is rotatably provided in the actuator support portion 2*a* of the switch main body 2, in the buckle switch 1 FIG. 5(*b*) of the present embodiment shown in FIGS. 5(*a*) and 5(*c*).

Moreover, a spring 27 (corresponding to the actuator biasing means of the present invention) is mounted between the actuator 3 and the spring support portion 2*b* of the switch main body 2 in a pressed state. In this case, in the non-operation state of the buckle switch 1 shown in FIG. 5(*a*), the spring 27 is positioned at the left side of the actuator support portion 2*a* to bias the actuator 3 in the counterclockwise direction. Furthermore, a stopper 28 is provided in the switch main body 2 and the actuator 3 biased by the spring 27 contacts the stopper 28 such that it is in the non-operation position. In addition, in the operation state of the buckle switch 1 shown in FIG. 5(*c*), the spring 27 is positioned at the right side of the actuator support portion 2*a* to bias the actuator 3 in the clockwise direction which is opposite to that of the non-operation state. In the actuator 3 of the present embodiment, the contact portion 3*c* which contacts the actuator pressing portion 24*a* of the ejector 24 is provided at the front end of the pressing portion 3*b* for pressing the press button 13.

In the buckle switch 1 of the present embodiment, in the non-operation state of the buckle switch 1, the actuator 3 is biased by the spring 27 in the counterclockwise direction, that is, a direction that the pressing portion 3*b* of the actuator 3 is far apart from the press button 13. Thus, the actuator 3 is not suddenly moved to press the press button 13 and operate the buckle switch 1. The buckle switch 1 is surely held in the non-operation state.

Furthermore, when the ejector 24 is moved to the right side by inserting the tongue into the buckle, the actuator pressing portion 24*a* of the ejector 24 contacts the contact portion 3*c* of the actuator 3 and the actuator 3 rotates about the actuator support portion 2*a* in the clockwise direction. In accordance with the rotation of the actuator 3, the spring 27 also rotates about the spring support portion 2*b* in the clockwise direction and the spring 27 positioned at the left side of the actuator support portion 2*a* approaches the actuator support portion 2*a*. Further, when the rotation amount of the actuator 3 (corresponding to the operation amount of the present invention) is not greater than a predetermined amount which does not pass the actuator support portion 2*a*, the actuator 3 is biased by the spring 27 in the counterclockwise direction, that is, a direction that the movable contacts 9*a*, 9*b*, and 9*c* are not moved.

As shown in FIG. 5(*c*), if the spring 27 passes the actuator support portion 2*a* and is positioned at the right side of the actuator support portion 2*a*, the actuator 3 is biased by the spring 27 from the counterclockwise direction to the clockwise direction. That is, when the rotation amount of the actuator 3 exceeds the predetermined amount, the actuator 3 is biased by the spring 27 in the clockwise direction, a direction that the movable contacts 9*a*, 9*b*, and 9*c* are moved. Then, the actuator 3 automatically presses the press button 13 of the buckle switch 1 by the biasing force of the spring 27 without using the ejector 24, and the press button 13 is moved in the operation direction (right side in Figure) against the biasing force of the return spring 26. Thus, the buckle switch 1 is rapidly switched OFF to ON and the buckle switch 1 is in the operation state. Further, in the operation state of the buckle switch 1, since the actuator 3 is biased by the spring 27 in the clockwise direction, that is, a direction that the pressing portion 3*b* of the actuator 3 presses the press button 13, the actuator 3 is not suddenly moved to be separated from the press button 13. Thus, the buckle switch 1 is not switched to the non-operation state and is surely held in the operation state.

Moreover, in the operation state of the buckle switch 1, when the tongue 21 is pulled out of the buckle 22, the ejector 24 is moved from the position shown in FIG. 5(*c*) to the left side, and an actuator release-direction pressing portion 24*b* of the ejector 24 contacts the actuator 3 and the actuator 3 rotates about the actuator support portion 2*a* in the counterclockwise direction. If the position of the spring 27 is changed from the right side to the left side of the actuator support portion 2*a*, the actuator 3 is biased by the spring 27 in the counterclockwise direction. Thus, the actuator 3 automatically (without using the ejector 24) rapidly rotate in the counterclockwise direction by the biasing force of the spring 27, contacts the stopper 28, and is positioned in the non-operation location shown in FIG. 5(*a*).

According to the buckle switch 1 of the present embodiment, the operation of switching the buckle switch 1 from ON and OFF can be rapidly performed and the buckle switch 1 is surely and stably held in both the non-operation state and the operation state.

The other constructions of the other operations of the buckle switch 1 of the present embodiment are the same as those of the embodiments shown in FIGS. 3(*a*) through 3(*c*) and FIG. 4.

Furthermore, in the buckle switch 1 of the present embodiment, in order to detect the engagement between the tongue 21 and the buckle 22, the movement of the ejector 24 which is moved together with the insertion of the tongue 21 is detected. However, the present invention is not limited to this. The engagement between tongue 21 and the buckle 22 may be detected by operating the actuator 3 with the position change of the tongue 21 of which the position is changed depending on the engagement and the non-engagement between the tongue 21 and the buckle 22 or the position change of the other component of the buckle 22.

A buckle switch, a buckle including the buckle switch, and a seat belt device according to the present invention can be suitably used in a buckle which is equipped in a vehicle such as an automobile and into which a tongue, that is slidably supported by a seat belt for protecting a vehicle occupant, is inserted and engaged, and a seat belt device including the same.

What is claimed is:

1. A buckle apparatus including a buckle for receiving a tongue in a releasable locked position therein, the buckle apparatus comprising:
   a plurality of electrically conductive fixed contacts;
   a plurality of electrically conductive movable contacts corresponding to the plurality of electrically conductive fixed contacts with the movable contacts being shifted between an electrically connected state relative to the fixed contacts with the tongue in the releasable locked position and an electrically disconnected state relative to the fixed contacts with the tongue shifted from the releasable locked position to a released position; and
   slide interfaces between the corresponding fixed contacts and movable contacts configured so that two of the movable contacts slide against the corresponding two fixed contacts in the electrically connected state.

2. A buckle apparatus including a buckle for receiving a tongue in a releasable locked position therein, the buckle apparatus comprising:
   a fixed contact;
   a movable contact that is shifted between an electrically connected state relative to the fixed contact with the tongue in the releasable locked position and an electrically disconnected state relative to the fixed contact with the tongue shifted from the releaseably locked position to a released position; and
   a slide interface between the fixed contact and movable contact configured so that the movable contact slides against the fixed contact in the electrically connected state,
   wherein the fixed contact comprises a plurality of fixed contacts and the movable contact comprises a plurality of corresponding movable contacts with each of the corresponding fixed and movable contacts having a slide interface therebetween.

3. A buckle apparatus including a buckle for receiving a tongue in a releasable locked position therein, the buckle apparatus comprising:
   a fixed contact;
   a movable contact that is shifted between an electrically connected state relative to the fixed contact with the tongue in the releasable locked position and an electrically disconnected state relative to the fixed contact with the tongue shifted from the releasably locked position to a released position; and
   a slide interface between the fixed contact and movable contact configured so that the movable contact slides against the fixed contact in the electrically connected state,
   wherein the fixed contact and the movable contact comprise at least corresponding pairs of fixed contacts and movable contacts with one pair engaged in the releasably locked position of the tongue and the other pair engaged in the released position of the tongue, and
   a neutral state of the pairs of fixed and movable contacts with both pairs of contacts engaged.

4. The buckle apparatus of claim 3 including a third pair of corresponding fixed and movable contacts that are engaged in the electrically connected, electrically disconnected, and neutral states.

5. The buckle apparatus of claim 4 wherein all three pairs of movable and fixed contacts have a sliding interface therebetween.

6. The buckle apparatus of claim 4 wherein the movable contacts include a movable member on which the movable contacts are carried with the movable contacts being aligned in a predetermined linear direction.

7. The buckle apparatus of claim 6 including a switch operator that shifts the movable member in a linear direction transverse to the linear direction in which the movable contacts are aligned.

8. The buckle apparatus of claim 1 including a switch operator that is operable to shift the movable contacts between the electrically connected and disconnected states in a predetermined linear direction, and
   a biasing member that biases the switch operator in the predetermined linear direction.

9. A buckle apparatus including a buckle for receiving a tongue in a releasable locked position therein, the buckle apparatus comprising:
   a fixed contact;
   a movable contact that is shifted between an electrically connected state relative to the fixed contact with the tongue in the releasable locked position and an electrically disconnected state relative to the fixed contact with the tongue shifted from the releasably locked position to a released position;
   a slide interface between the fixed contact and movable contact configured so that the movable contact slides against the fixed contact in the electrically connected state;
   a switch operator that is operable to shift the movable contact between the electrically connected and disconnected states in a predetermined linear direction;
   a biasing member that biases the switch operator in the predetermined linear direction; and
   an actuator for shifting the switch operator against the bias of the biasing member, with the actuator including two portions that extend transverse to each other and transverse to an insertion direction of the tongue into the buckle with one of the portions configured for being engaged as the tongue is inserted in the buckle for shifting the actuator to shift the switch operator.

10. The buckle apparatus of claim 1 including an actuator having off and on positions and being operable to shift the movable contacts from the electrically disconnected state to the electrically connected state with shifting of the actuator between the off and on positions thereof, and
    a biasing mechanism that keeps the actuator biased toward either the off or on position absent shifting of the actuator away from either the off or on position by a predetermined amount.

11. A buckle apparatus including a buckle for receiving a tongue in a releasable locked position therein, the buckle apparatus comprising:
    a normally closed terminal including a fixed contact;
    a normally open terminal including a fixed contact;
    a common terminal including a fixed contact;
    three movable contacts each associated with one of the fixed contacts;

a movable member on which the three movable contacts are carried and that shifts in response to insertion of the tongue to the releasable locked position in the buckle so that the fixed contact of the normally open terminal is engaged with the corresponding movable contact and the fixed contact of the normally closed terminal is disengaged from the corresponding movable contact, and removal of the tongue from the releasable locked position shifts the movable member so that the fixed contact of the normally closed terminal is engaged with the corresponding movable contact and the fixed contact of the normally open terminal is disengaged from the corresponding movable contact, with the fixed contact of the common terminal staying in engagement with the corresponding movable contact with the tongue in the releasable locked position and removed therefrom.

12. The buckle apparatus of claim 11 wherein the movable and fixed contacts are arranged and configured for sliding engagement therebetween.

13. The buckle apparatus of claim 11 wherein the terminals are strips of conductive material with the fixed contacts formed integrally at ends thereof, and the movable contacts engage the corresponding fixed contacts by sliding along and against the terminal strips at the ends thereof.

14. The buckle apparatus of claim 11 wherein the fixed contacts and movable contacts have a neutral state with all three fixed contacts engaged with the corresponding movable contacts.

15. The buckle apparatus of claim 14 wherein the fixed contacts of the normally closed and open terminals have edges, and the contacts being arranged so that the corresponding movable contacts are engaged with the edges in the neutral state.

16. The buckle apparatus of claim 15 wherein the edges of the fixed contacts are aligned, and at least the movable contacts corresponding to the normally closed and open terminals are aligned.

17. The buckle apparatus of claim 11 wherein the movable contacts are arranged in alignment on the movable member.

18. The buckle apparatus of claim 17 wherein the movable member shifts in a predetermined linear direction transverse to the alignment of the movable contacts.

19. The buckle apparatus of claim 11 in combination with the tongue, a seat belt carrying the tongue, and a retractor for the seat belt.

* * * * *